Patented Dec. 7, 1943

2,336,358

UNITED STATES PATENT OFFICE

2,336,358

CHEESE TREATMENT

James D. Ingle, Chicago, Ill., assignor to Industrial Patents Corporation, Chicago, Ill., a corporation of Delaware No Drawing. Original application April 7, 1939, Serial No. 266,645. Divided and this application November 21, 1941, Serial No. 419,853

16 Claims. (Cl. 99—166)

This invention relates to a method of inhibiting the growth of mold on cheese.

One of the objects of this invention is to provide an improved method of packaging cheese with a novel coating composition whereby mold formation is substantially inhibited.

Other objects of this invention will become apparent from the detailed description and claims which follow.

The present application is a division of my copending application, Serial No. 266,645, filed April 7, 1939, now Patent No. 2,292,323.

In the manufacture of cheese, the curd is normally pressed in a mold, the mold having first been partially or wholly lined with cheesecloth. After the curd has been in the mold for a sufficient length of time to set, it is removed and placed in a cooler for one to two days until a partial rind has formed on the surface. The cheese is then dipped in molten paraffin, amorphous wax, or other wax composition to provide a protective coating over the surface of the cheese to prevent drying out of the cheese and growth of mold on the surface.

Various types of amorphous waxes and wax mixtures are employed in providing the protective coating. I may employ a mixture of paraffin or amorphous wax and a synthetic rubber resin, which is described and claimed in a copending application of James D. Ingle and Leon D. Mink, Serial No. 267,175, filed April 10, 1939.

In packaging pasteurized or processed cheese, the cheese is wrapped in a protective film or sheet, such as cellulose sheets, metal foil, and the like. I have found that in many cases, mold will grow in spite of the wrappings.

I have discovered that propionic acid normally insoluble in paraffin or wax and other types of wax-like coatings for cheese or for coating wrappers for cheese may be rendered soluble in the paraffin, wax, or wax-like coating by the addition of a small proportion of a higher fatty acid. A solution may be prepared by mixing melted paraffin or other wax, a higher fatty acid, and propionic acid.

The proportion of propionic acid and the higher fatty acid which is employed in the coating may be varied over wide limits and is dependent upon the individual requirements of the user of the coating composition. Since the propionic acid is relatively expensive and does not improve the physical properties of the wax coating, it is desirable to employ only such proportions of the acid as are necessary to impart the desired moldicidal qualities. The higher fatty acids tend to impart brittleness to the wax coatings and it is desirable, therefore, to employ only such proportions of the higher fatty acids as are necessary to render the propionic acid soluble in the wax coatings.

Representative coating compositions contain up to 1 per cent higher fatty acid, from 1 per cent to 10 per cent propionic acid, and the balance paraffin or amorphous petroleum wax or wax compositions. It will be appreciated that the proportions of higher fatty acids and propionic acid are illustrative and that higher proportions may be employed. A typical example of a wax which is particularly effective in coating cheese directly or coating cheese wrappers contains 0.3 per cent stearic acid, 3 per cent propionic acid, and the balance paraffin or other wax composition. The paraffin or amorphous wax is melted and the higher fatty acid added and thoroughly mixed with the melted wax. Propionic acid is then added and will dissolve quite readily in the mixture or solution of wax and higher fatty acid. The propionic acid and higher fatty acid may be added simultaneously to the wax, or the propionic acid may be added prior to the higher fatty acid.

I have found that higher fatty acids, either saturated or unsaturated, having from 8 to 26 carbon atoms in their molecules are satisfactory for rendering propionic acid soluble in amorphous petroleum waxes or wax resin mixtures. Examples of acids which are satisfactory and which are desirable since their melting points are below the boiling point of water and they will not affect appreciably the melting point of the wax coating are caprylic acid, capric acid, lauric acid, myristic acid, palmitic acid, stearic acid, and oleic acid.

The coating composition containing propionic acid may be substituted for the usual paraffin or other wax coating employed in the manufacture of cheese. In the case of processed and pasteurized cheese which is marketed in packages containing from ¼ pound to 5 pounds, the cellulose wrapper or metal foil wrapper may be coated with a thin film of the wax containing propionic acid. The coating should be applied to the surface of the wrapper which comes in contact with the cheese, but may be applied to both surfaces, if desired.

Obviously, many modifications and variations of the invention hereinbefore set forth may be made without distinguishing from the spirit and scope thereof, and therefore only such limitations should be imposed as are indicated in the apparent claims.

I claim:

1. The method of packaging cheese to prevent growth of mold which comprises coating the cheese with a petroleum wax containing a higher fatty acid and propionic acid.

2. The method of packaging cheese which comprises applying to the surface of the cheese a coating comprising mainly petroleum wax and small amounts of a fatty acid and propionic acid, the fatty acid being present in sufficient amount to render the propionic acid soluble in the wax and the propionic acid being present in sufficient amount to substantially retard mold formation.

3. The method of packaging cheese whereby growth of mold is substantially retarded which comprises covering green cheese with a petroleum wax coating containing a higher fatty acid and propionic acid.

4. The method of packaging cheese which comprises pressing curd into a mold to form a green cheese and coating the green cheese with a petroleum wax composition containing a higher fatty acid and propionic acid, said cheese being substantially resistant to mold formation.

5. The method of packaging pasteurized cheese which comprises applying to a cheese wrapper a petroleum wax coating containing higher fatty acid and propionic acid and then covering the cheese with the wrapper so that said film contacts the surface of the cheese whereby mold formation is substantially retarded.

6. The method of inhibiting the growth of mold on cheese which comprises coating the cheese with an amorphous petroleum wax containing a higher fatty acid and propionic acid.

7. The method of inhibiting the growth of mold on cheese which comprises coating the cheese with a petroleum wax containing stearic acid and propionic acid.

8. The method of inhibiting the growth of mold on cheese which comprises coating the cheese with a petroleum wax containing oleic acid and propionic acid.

9. The method of inhibiting the growth of mold on cheese which comprises coating the cheese with a petroleum wax containing palmitic acid and propionic acid.

10. The method of inhibiting the growth of mold on cheese which comprises enclosing the cheese in a wrapper coated with a petroleum wax containing a higher fatty acid and propionic acid.

11. An article of manufacture consisting of cheese having a coating thereon comprising an amorphous petroleum wax, a higher fatty acid, and propionic acid.

12. A cheese package comprising cheese coated with a petroleum wax containing a higher fatty acid and propionic acid, the higher fatty acid being present in sufficient amount to render the propionic acid soluble in the coating and the propionic acid being present in sufficient amount to substantially retard mold formation on the cheese.

13. A cheese package comprising cheese covered with a coating comprising mainly petroleum wax and small amounts of a higher fatty acid and propionic acid, the higher fatty acid being present in sufficient amount to render the propionic acid soluble in the wax and the propionic acid being present in sufficient amount to substantially prevent mold formation on the cheese.

14. A cheese package comprising cheese coated with a waxy composition comprising up to 1 per cent of a higher fatty acid, about 1 to 10 per cent propionic acid and the remainder petroleum wax.

15. A cheese package comprising cheese covered with a wrapper and a coating for the wrapper containing essentially petroleum wax, a higher fatty acid and a propionic acid.

16. A cheese package comprising cheese, a wrapper for the cheese and a coating for the wrapper, said coating containing essentially amorphous petroleum wax, a higher fatty acid and a propionic acid.

JAMES D. INGLE.